United States Patent [19]

Larsen et al.

[11] Patent Number: 5,166,597
[45] Date of Patent: Nov. 24, 1992

[54] PHASE-SHIFTING TRANSFORMER SYSTEM

[75] Inventors: Einar V. Larsen, Charlton; Nicholas W. Miller, Delmar, both of N.Y.

[73] Assignee: Electric Power Research Institute, Palo Alto, Calif.

[21] Appl. No.: 742,859

[22] Filed: Aug. 8, 1991

[51] Int. Cl.$^5$ .............................................. G05F 5/04
[52] U.S. Cl. .................... 323/215; 323/216; 323/218; 323/255
[58] Field of Search ............... 323/215, 216, 218, 255, 323/257, 258, 340, 342

[56] References Cited

U.S. PATENT DOCUMENTS

| | | | |
|---|---|---|---|
| 3,652,925 | 3/1972 | Yamana | 323/215 |
| 3,944,913 | 3/1976 | Kugler | 323/215 |
| 4,013,942 | 3/1977 | Boshnyaga | 323/119 |
| 4,469,997 | 9/1984 | Curtiss | 318/729 |

OTHER PUBLICATIONS

P. Wood, et al., "Study of Improved Load-Tap Changing for Transformers and Phase-Angle Regulators," EPRI Report No. EL-6079, Nov. 1988.

Primary Examiner—Steven L. Stephan
Assistant Examiner—Adolf Berhane
Attorney, Agent, or Firm—Klarquist, Sparkman, Campbell, Leigh & Whinston

[57] ABSTRACT

A faster, more controllable phase-shifting transformer system is provided, along with a method of retrofitting and upgrading a preexisting system for faster operation, and a method of applying a desired phase shift to the voltage on a polyphase transmission line. A phase-shifting transformer set has series and regulating transformers coupled together by a switching network. An optional modulator modulates the phase shift voltage about a nominal level established by the switching network. The modulator may be a variable susceptance switched inductor or a switched capacitor, or a variable source device, such as a voltage source inverter device or a synchronous condenser. A thyristor augmented switching network may have a pair of thyristor valves augmenting a reversing switch, or a thyristor augmented load tap changer for varying the phase shift discreet step magnitude. Continuous control over the effective phase shift is obtained by partial conduction control of a thyristor valve with a harmonic filter in parallel with each excited winding of the series transformer, and by including a harmonic filter across the ends of regulating winding of the regulating transformer.

36 Claims, 4 Drawing Sheets

FIG. 4
POWER ANGLE CURVE

PHASE-SHIFTING TRANSFORMER SYSTEM

BACKGROUND OF THE INVENTION

The present invention relates generally to a phase-shifting transformer system, and more particularly to an improved faster phase-shifting transformer system. The present invention also relates to a method of retrofitting a preexisting phase-shifting transformer system for faster response than in earlier systems, and a method of applying a desired phase shift to the voltage on a polyphase transmission line.

Phase-shifting transformers have been used since the early days of three-phase alternating current (AC) power networks. The basic phase-shifting transformer configurations were established more than sixty years ago, with the succeeding generations of design refining the major transformer components. Phase-shifting transformers are often used to track very slow system changes, on the order of minutes to hours, corresponding to utility load variations. For example, these earlier systems may cycle over a range of 20° in 24 hours, such as by starting at a 20° phase shift at midnight, increasing to 40° during the day's peak load, and returning to 20° again at midnight. These earlier systems were incapable of being controlled for faster operation, and thus, were incapable of forming a part of a stability-enhancing scheme for a power network. Two of the earlier configurations for coupling a phase-shifting transformer with a power network will be described hereafter with reference FIGS. 8A-10 of the drawings.

Figures 8A, 8B, 8C:
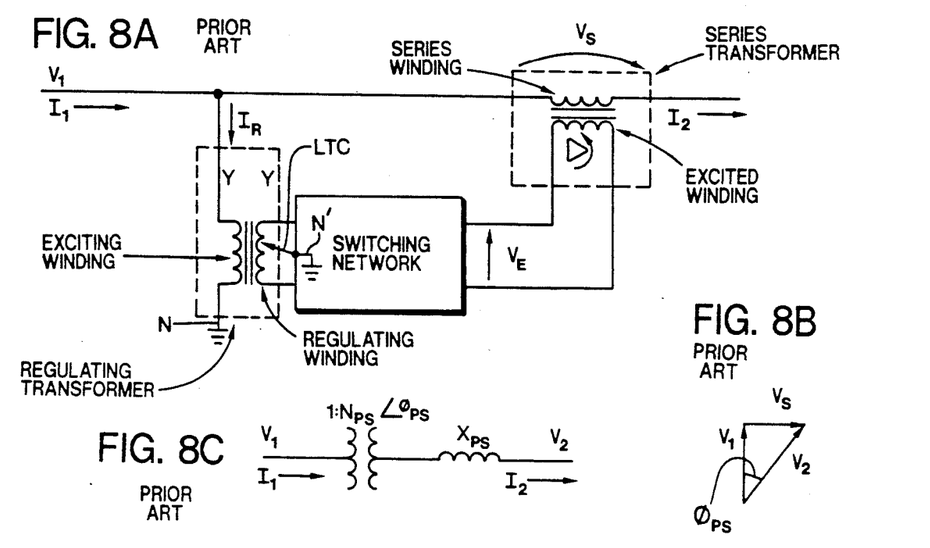
FIGS. 8A-8C illustrate a prior art one-sided phase-shifting transformer system, with FIG. 8A being a single-phase schematic block diagram, FIG. 8B being a phasor diagram, and FIG. 8C being a single line diagram of this one-sided system.

In general, a phase shift is obtained by extracting a line-ground voltage from one phase of a transmission line and injecting a portion of the extracted voltage in series with another phase of the line. Typically, this is accomplished using two transformers, with one in shunt (referred to as the "regulating" transformer), and one in series (termed the "series" transformer) with the transmission line. This may be accomplished in several ways, two of which are shown in the power circuit single phase diagrams of FIGS. 8A and 9A. FIG. 8A illustrates the basic elements of a one-sided phase-shifting transformer system, while FIG. 9A illustrates the basic elements of a symmetrical system.

Appropriate wye-wye and wye-delta connections of the regulating and series transformers are used to supply the injected series voltage $V_S$ in quadrature with the line-ground voltage. This is often accomplished using a rotated delta connection of the series transformer excited winding, where, for example, phase A of the excited winding is connected with phase C of the regulating winding. This quadrature relationship is shown in the phasor diagrams of FIGS. 8B and 9B which correspond to the circuits 8A and 9A, respectively. In FIG. 8B, the injected voltage phasor $V_S$ is perpendicular to, that is in quadrature with, the incoming voltage phasor $V_1$. Similarly, in FIG. 9B, the horizontal voltage phasor $V_S$ is in quadrature with the vertical line-ground regulating voltage phasor $V_R$, which is extracted from the center tap of the series transformer series winding. The phase shift angle in both FIGS. 8B and 9B is indicated as $\phi_{PS}$. FIGS. 8C and 9C are single line diagrams for positive sequence modelling of the circuits of FIGS. 8A and 9A, respectively.

The effective reactance of the phase-shifting transformer system varies with the tap setting of the load tap changer (LTC). In the extreme case of zero phase shift, the leakage impedance of the series winding will remain in the transmission path, whereas at the full rated phase shift, the effective impedance will be increased by the impedance of the regulating transformer.

Figure 9A:
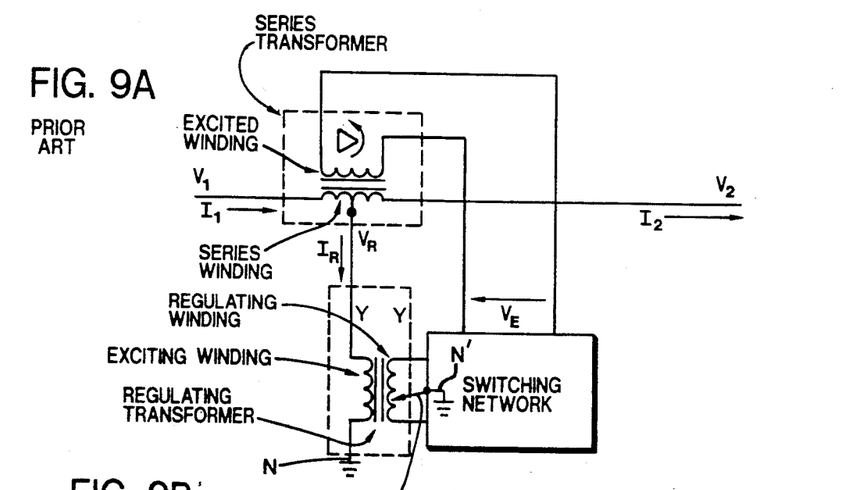
FIG. 9A-9C illustrate a prior art symmetrical phase-shifting transformer system, with FIG. 9A being a single-phase schematic block diagram, FIG. 9B being a phasor diagram, and FIG. 9C being a single line diagram of this symmetrical system.
Figure 9B:
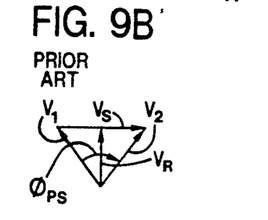
Figure 9C:
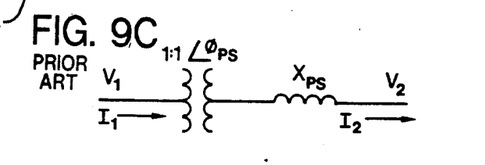
Figure 10:
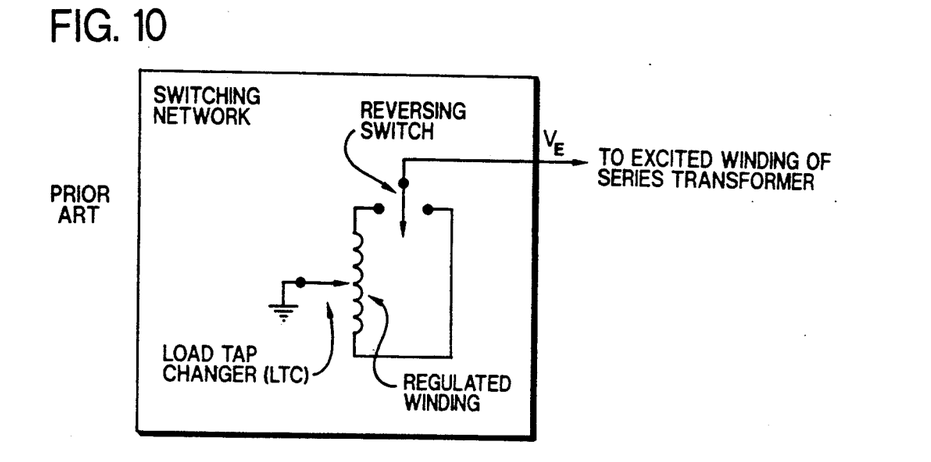
FIG. 10 is a schematic block diagram of a prior art switching network used in the prior art one-sided and symmetrical phase-shifting transformer systems of FIGS. 8A and 9A, respectively.

FIG. 10 illustrates one phase of a typical switching network used in the FIG. 8A one-sided and FIG. 9A symmetrical arrangements, with the regulating winding of the regulating transformer shown schematically for convenience as being a part of the switching network. The phase shift is controlled by adjusting a load-tap changing device or load-tap changer (LTC) and by toggling a reversing switch. One end of the regulating winding is connected to the excited winding of the series transformer, as shown in FIGS. 8A and 9A. The wiper on the LTC can traverse the full length of the regulating winding to provide a variable series voltage, with the voltage steps determined by taps on the regulating winding. In this manner, the LTC is used to change the voltage applied to the series transformer excited winding by coupling selected different taps of the regulating winding to a neutral ground potential, i.e. the neutral tie of the three phase regulating winding wye connection.

By toggling or throwing the reversing switch of FIG. 10, phase shifts of the opposite polarity are obtained. However, such toggling action does not simply reverse the sign of the phase shift. Rather, the change in the phase shift angle $\phi_{PS}$ is equal to the rated phase shift of the phase-shifting transformer set. For example, if the transformer set is rated for a 45° maximum phase shift and the LTC is adjusted for a 15° advance, then throwing the reversing switch will change the phase shift to a 30° retard angle, rather than a 15° retard.

However, one serious drawback of the FIG. 10 switching network, and thus of the arrangements of FIGS. 8A and 9A is the relatively slow action for which both the LTC and reversing switch are usually designed. Additionally, the LTC must change taps under full load, and thus, disadvantageously requires frequent maintenance.

In general, switching of the phase shifter tap positions by moving the LTC wiper across the regulating winding affects both the series flow of current in the transmission line and the shunt voltage at the bus. To bypass the current flow through the series winding, either the regulating or series winding is shorted, which appears as a short circuit on the bus. The short circuit current is limited through the impedance of the regulating transformer, with this impedance selected by the particular tap position of the LTC. On the other hand, if either the regulating or series winding is opened for some reason, this action appears as an open circuit to the transmission line.

Due to these effects on the transmission line, the phase-shifting transformer system switching control must be rather sophisticated to prevent undesirable disturbances on the power system. Existing technology for the LTC function includes vacuum interrupters to break any arc formed when the sliding contacts (wiper) move across adjacent tap positions. This operation of the LTC forms a part of a complex series of internal switching operations.

Relatively newer LTCs have been equipped with thyristor valves to provide arcless operation, which would also beneficially reduce maintenance as a result of less damage being incurred through switch arcing. In these earlier LTC designs, the thyristor valves do not carry current normally, but only when a tap change is taking place. This aspect of the operation has one of the most desirable attributes of a controllable device on a power grid, in that the losses are low during normal operation.

Another type of phase-shifting transformer system has been proposed which has no series transformer, but rather only a specially designed regulating transformer coupled with a bank of thyristor switches. The primary windings of the regulating transformer are coupled with the transmission line, and the secondary windings are coupled with the bank of thyristor switches. The secondary windings are proportioned in ternary progression, that is, they are wound as three separate individual coils, with the respective turns ratios of the first, second and third coils being one, three and nine, respectively. By connecting the three secondary coils in their various combinations, the turns ratio with respect to the primary may be varied from a positive 13 to a negative 13. For example, by coupling a negative polarity of the first coil (turns ratio of one, thus, "−1") in series with a positive polarity of the second coil (turns ratio of three, thus, "+3"), and omitting the third coil, the effective turns ratio of the secondary windings becomes +2. However, since this system has no series transformer, the bank of thyristor switches in series with the transmission line. Thus, this thyristor bank continually imposes a load on the transmission system. Furthermore, the thyristor bank must be designed to handle the full load current of the line, as well as having the same BIL (basic insulation level) rating as the line, both of which are costly disadvantages, in terms of both initial manufacturing costs and operating costs. Additionally, such a one-sided arrangement is inherently more costly than a symmetrical arrangement for large phase shifts. Moreover, this approach requires a totally new transformer design having three secondary windings, rather than a conventional single winding with plural taps. The optimization of such a new transformer design is often a costly and time-consuming process. This system is also an all-or-nothing approach, having no flexibility in terms of selecting various modulation and/or thyristor control schemes to tailor the degree of available control as desired for different applications.

Thus, a need exists for an improved and faster phase-shifting transformer system and a method of retrofitting a preexisting phase-shifting transformer system for use in industrial and electric utility applications, which is directed toward overcoming, and not susceptible to, the above limitations and disadvantages.

SUMMARY OF THE INVENTION

According to one aspect of the present invention, a phase-shifting transformer system for applying a desired phase shift to the voltage on a transmission line includes a phase-shifting transformer set, a switching network and a modulator. The phase-shifting transformer set has a series transformer and a regulating transformer. The series transformer has mutually magnetically coupled series and excited windings, with the series winding being for coupling in series with the transmission line. The regulating transformer has mutually magnetically coupled exciting and regulating windings, with the exciting winding being for receiving power from the transmission line, and the regulating winding having two opposing ends with plural taps therebetween.

The switching network couples together the regulating winding of the regulating transformer with the excited winding of the series transformer. The switching network has a load tap changer for selectively coupling one of the plural taps of the regulating winding with a neutral ground potential. The switching network also has a reversing switch for selectively coupling either end of the regulating winding with the series transformer excited winding. The positions of the load tap changer and reversing switch establish a nominal phase-shifting voltage level on the series transformer series winding. The modulator is coupled with the series transformer to modulate the voltage of the series transformer series winding about this nominal phase-shifting voltage level.

In an illustrated embodiment, the modulator may comprise a variable susceptance device, such as a switched capacitor or a switched inductor. In another illustrated embodiment, the modulator may comprise a variable source device, such as a voltage source inverter or a synchronous machine.

According to another aspect of the present invention, a phase-shifting transformer system is provided for applying a desired phase shift to the voltage on a transmission line, and includes a phase-shifting transformer set which may be as described above. According to this aspect of the present invention, the phase-shifting transformer system also includes a thyristor-augmented switching network which couples together the regulating transformer regulating winding with the series transformer excited winding. The thyristor-augmented switching network has a load tap changer for selectively coupling one of the plural taps of the regulating winding with a neutral ground potential, and a reversing switch for selectively coupling either end of the regulating winding with the series transformer excited winding. The load tap changer or the reversing switch or both may be augmented by at least one thyristor valve, with the positions of the load tap changer and reversing switch establishing a nominal phase-shifting voltage level on the series transformer series winding.

Several embodiments of a phase-shifting transformer system having a thyristor-augmented switching network are illustrated herein. In one illustrated embodiment, the thyristor-augmented switching network includes thyristor augmentation of the reversing switch comprising first and second thyristor valves. In another illustrated embodiment, the thyristor-augmented switching network includes thyristor augmentation of the load tap changer comprising a thyristor valve coupling one of the plural taps of the regulating winding with a neutral ground potential. In this embodiment, the load tap changer comprises a switched load tap changer.

In yet another illustrated embodiment, the thyristor-augmented switching network has a first thyristor valve and a first filter, each of which are coupled in parallel with the series transformer series winding. In a further illustrated embodiment, the phase-shifting transformer system includes a phase-shifting transformer set, a thyristor-augmented switching network, and a modulator coupled with the series transformer.

According to a further aspect of the present invention, a method is provided of retrofitting a phase-shifting transformer system to more rapidly apply a desired phase shift to the voltage on a transmission line. The retrofitting method includes the step of identifying a phase-shifting transformer system requiring retrofitting which includes a series transformer having mutually magnetically coupled series and excited windings, with the series winding being coupled in series with the transmission line. The identified transformer system also has a regulating transformer with mutually magnetically coupled exciting and regulating windings. The exciting winding receives power from the transmission line. The identified system also has a switching network coupling together the regulating winding of the regulating transformer with the excited winding of the series transformer for establishing a nominal phase-shifting voltage level on the series transformer series winding. The retrofitting method includes the step of coupling a modulator with the series transformer to modulate the voltage of the series transformer series winding about a nominal phase-shifting voltage level provided by the switching network.

In an illustrated embodiment, the retrofitting method step of coupling includes coupling a variable susceptance device, such as a switched capacitor or a switched conductor, in parallel with the series transformer series winding. In another illustrated embodiment, the retrofitting method coupling step comprises coupling a variable source device, such as a voltage source inverter or a synchronous machine, in series with the series transformer excited winding.

According to yet another aspect of the present invention, a method of retrofitting a phase-shifting transformer system is provided including the step of identifying a system having a phase-shifting transformer set having series and regulating transformers coupled together with a switching network. The switching network may include a reversing switch and a load tap changer. The method of retrofitting includes the step of augmenting the switching network with at least one thyristor valve.

In an illustrated embodiment, the retrofitting method augmenting step includes augmenting the reversing switch with first and second thyristor valves. This is accomplished by coupling the first thyristor valve between one end of the regulating winding and the series transformer excited winding, and by coupling the second thyristor valve between the other end of the regulating winding and the series transformer excited winding.

In another illustrated embodiment, the retrofitting method augmenting step comprises augmenting the load tap changer with a thyristor valve coupling a first one of the plural taps of the regulating winding with a neutral ground potential. This illustrated method also includes the step of substituting the load tap changer of the switching network with a switched load tap changer.

In a further illustrated embodiment of the retrofitting method, the augmenting step includes coupling a first thyristor valve and a first filter in parallel with the series transformer series winding. In yet another illustrated embodiment, the retrofitting method further includes the step of coupling a modulator with the series transformer, in addition to the step of augmenting the switching network with at least one thyristor valve.

According to another aspect of the present invention, a method is provided of applying a desired phase shift to the voltage on a polyphase transmission line operating at a system frequency. This method includes the steps of drawing a polyphase regulating current at a regulating voltage from the transmission line, and establishing a nominal magnitude of a shifting voltage which is in quadrature with the regulating voltage. In a changing step, the shifting voltage magnitude is changed within a single cycle of the system frequency to modify the phase shift as desired. In an injecting step, the changed shifting voltage is injected in series with the voltage on the transmission line.

In an illustrated embodiment, the changing step comprises the step of modulating the shifting voltage magnitude about the established nominal magnitude with a variable modulating voltage. In another illustrated embodiment, the changing step comprises the step of changing the shifting voltage established nominal magnitude at a zero crossing of a half cycle of the system frequency. In a further illustrated embodiment, the changing step comprises the step of chopping the shifting voltage waveform between zero crossings of a half cycle of the system frequency to vary the shifting voltage magnitude about the established nominal magnitude within a half cycle of the system frequency, and the injecting step comprises the step of injecting the chopped shifting voltage in series with the voltage on the transmission line. Additionally, where undersirable harmonics are generated during the chopping step, the illustrated method may also include the step of filtering the undesirable harmonics from the chopped shifting voltage prior to the injecting step.

It is an overall object of the present invention to provide an improved phase-shifting transformer system.

An additional object of the present invention is to provide a phase-shifting transformer system which is faster and more flexible in its controllability than earlier systems.

A further object of the present invention is to provide improved methods of retrofitting a preexisting phase-shifting transformer system and of fitting thyristor control to existing designs for such systems.

Another object of the present invention is to provide a retrofit system for easily and economically retrofitting a preexisting phase-shifting transformer system to provide for more flexible control than found in earlier systems.

Still another object of the present invention is to provide a modular, building block type of approach to retrofitting a preexisting phase-shifting transformer system, and to fitting existing transformer designs for such systems, with thyristor control and/or modulation.

A further object of the present invention is to provide an improved phase-shifting transformer system which requires less maintenance than earlier systems.

An additional object of the present invention is to provide a phase-shifting transformer system capable of functioning as a part of a stability-enhancing scheme for a power network.

Yet another object of the present invention is to provide an improved phase-shifting transformer system which is more economical to manufacture and operate than the earlier known systems.

Several advantages may be realized by implementing the retrofit system and thyristor-augmented switching network within a phase-shifting transformer system, and by employing a method of retrofitting as described herein. First, these methods and devices may be employed using existing optimized transformer designs. Second, the approach described herein is modular in nature, that is, one may pick and choose among the various options to customize a phase-shifting transformer system as desired, whether this system is a newly manufactured phase-shifting transformer system of a preexisting system already in service.

Moreover, building upon the concept of having the normal load tap changer (LTC) carry all or most of the current during normal operation, leads to several interesting options for thyristor-based devices to be used as a modulating influence during switching, as described further below in the detailed description. There are several other benefits to using the approaches described herein, including low losses and relatively low ratings of the control circuit and thyristor equipment as compared to the total ratings of the series and regulating tansformers. Furthermore, the control circuit and thyristor equipment described herein have lower losses and lower ratings than the previously proposed implementation of thyristor control within a phase shifting system described above in the background portion. Another significant advantage of the systems described herein is the ability to retrofit preexisting phase-shifting transformer sets which are already in service, and thereby gain increased utilization of the unit with a relatively minimal capital outlay, as compared to the cost of purchasing an entirely new phase-shifting transformer system.

The present invention relates to the above features and objects individually as well as collectively. These and other objects, features and advantages of the present invention will become apparent to those skilled in the art from the following description and drawings.

DETAILED DESCRIPTION OF THE PREFERRED EMBODIMENTS

Figure 1:
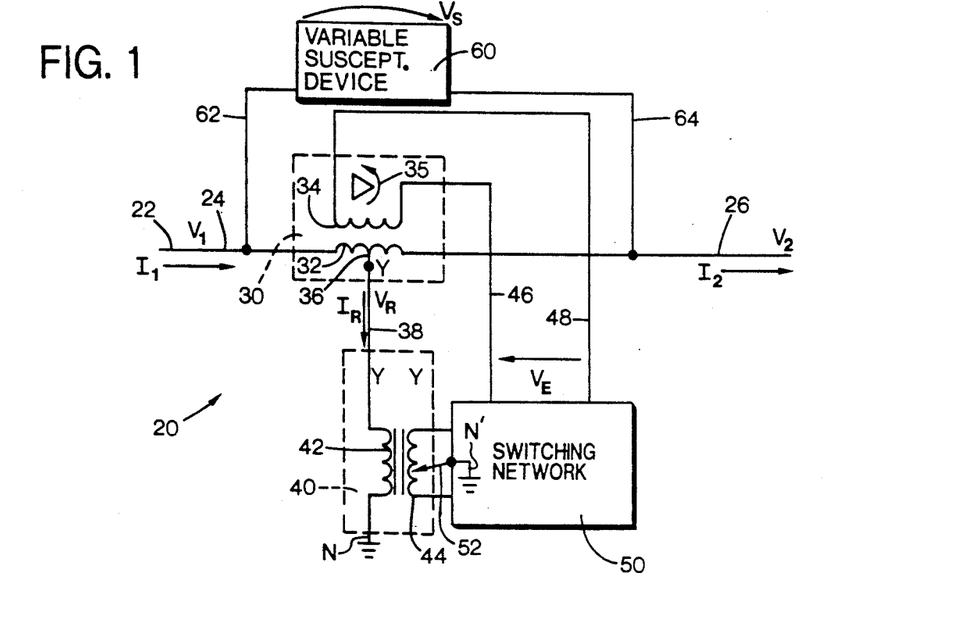
FIG. 1 is a single-phase schematic block diagram of one form of a phase-shifting transformer system of the present invention providing phase shift modulation.

FIG. 1 is a single phase diagram representation of an illustrated embodiment of a three-phase symmetrical phase-shifting transformer system or phase shifter, comprising a variable susceptance phase shifter 20, constructed in accordance with the present invention. The phase shifter 20 is coupled in series with a three phase power transmission line 22, having power flowing from an input side 24 through the phase shifter 20 to an output side 26. At the input side 24, the incoming voltage and current are indicated as $V_1$ and $I_1$, respectively, while at the output side 26, the outgoing voltage and current are indicated as $V_2$ and $I_2$, respectively. While three-phase embodiments are illustrated herein, it is apparent that the systems and methods described herein may be applied to other transmission systems, such as a six-phase system.

In FIG. 1, the phase shifter 20 has a transformer set illustrated as comprising a three-phase wye-delta series transformer 30, with each phase having a series winding 32 magnetically coupled with an excited winding 34. The excited winding 34 is connected in a rotated delta configuration, as indicated by the triangle with curved arrow 35 appearing adjacent to winding 34. The series winding 32 is in series with and couples together the transmission line input and output sides 24 and 26. The voltage across the series winding is indicated as $V_S$. The illustrated series winding 32 has a center tap 36 which draws a regulating voltage and current $V_R$ and $I_R$, respectively, from the series winding 32.

A three-phase conductor 38 delivers the regulating voltage and current $V_R$, $I_R$ from the series transformer center tap 36 to a wye/wye three-phase regulating transformer 40, and more specifically to a three phase primary thereof, with each primary phase comprising an exciting winding 42. The three exciting windings 42 are coupled together at a neutral point N to complete the wye connection. The regulating transformer 40 also has three phase secondary, with each secondary phase comprising a regulating winding 44 magnetically coupled with an associated exciting winding 42 of the primary.

Three-phase conductors, indicated as conductors 46 and 48 in the single phase representation of FIG. 1, couple the regulating winding 44 of each phase with the series transformer excited winding 34 for each phase via the internal connections of a switching network 50. The excited windings 34 are coupled in a rotated delta connection with the regulating windings 44, where, for instance, the phase A excited winding is connected with the phase C regulating winding, which in essence subtracts the 30° wye/delta phase shift from the 120° difference between the A and C phases. In this fashion, the series winding voltage $V_S$ is caused to be in quadrature (i.e., 120°−30°=90°) with the regulating voltage $V_R$ of the regulating transformer exciting winding 42 (see FIGS. 8B and 9B).

The switching network 50 may be an earlier version, as described above for FIG. 10 in the background portion, or the switching network 50 may take the form of one of the new fast-acting embodiments described further below (see FIGS. 5-7). Typically, the switching network 50 includes a three-phase load tap changing device or load tap changer (LTC), having a single-phase LTC 52 for each phase, which is controlled by the switching network 50 to move between a plurality of conventional taps (not shown) on the regulating winding 44. The LTC device may be a conventional three-phase LTC, as described in the background portion above with respect to FIG. 10, which for each phase A, B and C, simultaneously selects one of the taps between the opposing ends of winding 44. Each LTC 52 couples the selected tap to a neutral ground point N' (see FIGS. 5-7) to complete the wye connection of the regulating winding 44. The output phase voltage for the switching network 50 between conductors 46 and 48 is the excited winding voltage $V_E$, which appears across each series transformer excited winding 34.

The phase shifter 20 also includes a modulator, such as a variable susceptance device 60 coupled in parallel with the series transformer series winding 32 by the three-phase conductors 62 and 64. The variable susceptance device 60 may be, for example, a conventional switched capacitor controlled by mechanical switches or thyristors (not shown). Alternatively, the variable susceptance device may be a conventional switched inductor controlled by mechanical switches or thyristors (not shown). In some applications, the variable susceptance device may include an optional three-phase coupling transformer (not shown) coupling the device with the conductors 62 and 64.

The basic function of the phase shifter 20 is to inject a variable voltage $V_S$ in series with the transmission line 22. The effective phase shift is nearly proportional to the voltage magnitude $|V_S|$ of the series winding 32. Thus, using a thyristor-controlled device capacitor or inductor is particularly advantageous to rapidly modulate the injected series voltage $V_S$ about a nominal phase-shifting voltage level established in part by the mechanical LTC 52. This modulation is accomplished by changing the value of the variable susceptance, which changes the value of $V_E$ supplied by the regulating winding 44 and switching network 50, to vary and modulate the value of $V_S$ injected into the transmission line 22.

The variable susceptance device 60, which is in parallel with the series winding 32, has an effect similar to applying a static VAR (volt-amperes-reactive) compensator (SVC) at a bus in the vicinity of the phase shifter 20. However, the variable susceptance device 60 advantageously gains leverage on the series voltage $V_S$ injected by the phase shifter 20, via the leakage impedance of the series and regulating transformers 30 and 40, which a local SVC would not be able to accomplish. The equipment used to construct the variable susceptance device 60 is similar to a typical SVC, except the variable susceptance device 60 is coupled in parallel with the series winding 32 of the series transformer 30.

One drawback to the variable susceptance phase shifter 30 is that the phase shifter's leverage on power transfer diminishes as the phase shifter setting approaches a phase shift of zero. At the limit of zero phase shift, the variable susceptance device 60 works with circulating currents through the leakage reactance of the series transformer 30 to create a small variable series impedance, but no other leverage is applied to the series injected voltage, that is, $V_E$ remains zero.

Figure 2:
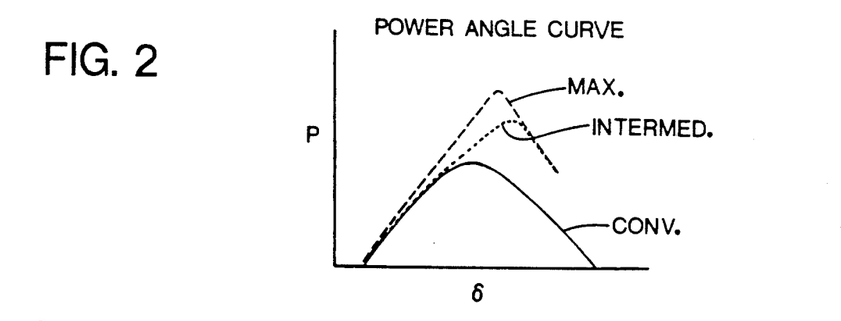
FIG. 2 is a graph illustrating the power angle curve of the system illustrated in FIG. 1.

The graph of FIG. 2 illustrates the power angle curve for the overall transmission system including the variable susceptance phase shifter 20 of FIG. 1. The solid line, labelled "CONV." represents the power angle for a conventional phase-shifting transformer system, such as that shown in FIG. 8A or FIG. 9A. The long-dashed curve labelled "MAX." represents the maximum power angle curve obtainable with phase shifter 20, and the short-dashed curve labelled "INTERMED." represents an intermediate power angle curve obtainable with phase shifter 20.

Figures 3A, 3B, 4, 5:
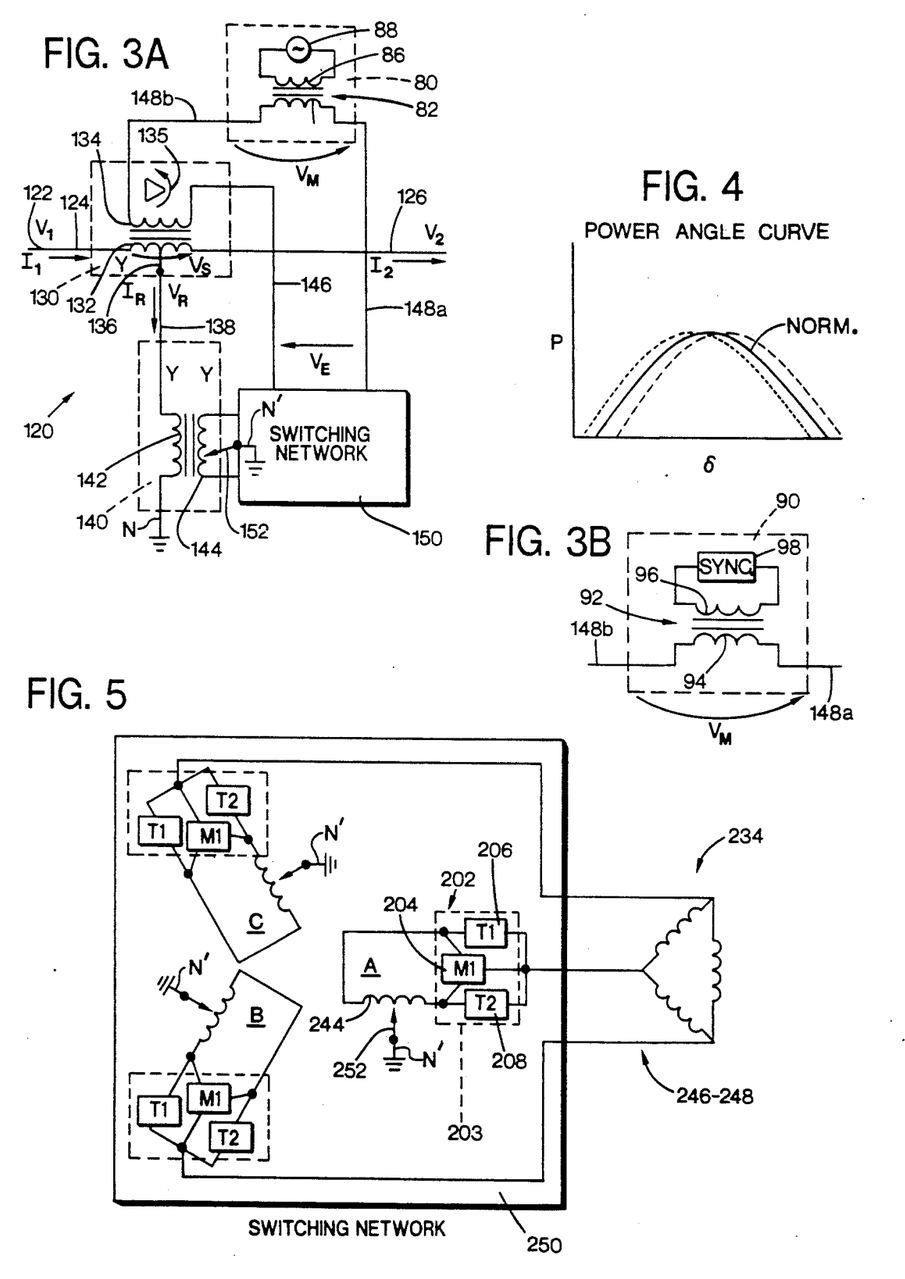
FIG. 3A is a single-phase schematic block diagram of one form of an alternate phase-shifting transformer system of the present invention employing phase shift modulation.
FIG. 3B is another alternate manner of employing phase shift modulation which may be substituted for a component in the FIG. 3A embodiment.
FIG. 4 is a graph of power angle curve of the system of FIG. 3.
FIG. 5 is a three-phase schematic block diagram of a phase-shifting transformer system of the present invention using a thyristor-augmented reversing switch scheme.

Referring now to FIG. 3A, an alternate embodiment of the present invention is shown comprising a variable source phase-shifting transformer system or variable source phase shifter 120. Several of the components of the variable source phase shifter 120 may be the same as that described with respect to the variable susceptance phase shifter 20 of FIG. 1. These like components have item numbers increased the FIG. 3A embodiment by one hundred over the item numbers of like components in the FIG. 1 embodiment. For example, in FIG. 3A the series transformer is numbered as 130, and the regulating transformer as 140, whereas in FIG. 1, these devices are labelled 30 and 40, respectively. However, the three-phase conductor 48 of FIG. 1 is represented in the FIG. 3A embodiment as having two components, 148a and 148b, which are coupled together by a second embodiment of a modulator comprising a variable source device, such as an inverter, illustrated as a voltage source inverter (VSI) device 80. Other inverter technologies, including solid state converter technology, which produce comparable effects may be used as the variable source device, such as a conventional current source inverter or other devices known to be interchangeable by those skilled in the art.

The VSI device 80 may have an optional three-phase coupling transformer 82 with magnetically coupled primary and secondary windings 84 and 86, respectively. An AC source, such as a conventional variable voltage source inverter (VSI) 88 is coupled in series with the coupling transformer secondary winding 86.

Thus, the voltage source inverter device 80 is in series with the excited winding 134 of the series transformer 30 and modifies the phase voltage output $V_E$ of the regulating tranformer 144 and switching network 150 by a modulation voltage $V_M$. The illustrated voltage source inverter device 80 may have, for example, a relatively small rating on the order of 10% of the through power rating of the variable source phase shifter 120. The voltage source inverter device 80 provides some modulation capability on the order of a few degrees or so of phase shift. This example is based on likely economic choices, but it is apparent that other selections may also be made as desired.

In a conventional phase-shifting transformer system, such as those of FIGS. 8A and 9A discussed in the background portion above, the series transformer and the regulating transformer are typically each housed in separate tanks. Thus, the winding leads of both the series and regulating transformers are designed to be connected together external to the tanks. Thus, there is relatively little burden imposed by coupling the primary winding 84 of the coupling transformer 82 (if used) between the regulating winding and the excited winding. The VSI 88 may then be connected in series with the secondary winding 86 of the coupling transformer 82, as shown in FIG. 3A. Alternatively, if no coupling transformer is used, there is even less burden imposed by coupling only the VSI 88 between the regulating and excited windings. Advantageously, the voltage source inverter device 80 provides modulation to the series injection of voltage $V_S$ into the series winding 132 via the excited winding 134.

FIG. 3B shows a third embodiment of a modulator comprising a variable source device, illustrated as a variable source synchronous machine device 90, which may be used in place of the VSI device 80 in the variable source phase shifter 120 of FIG. 3A. The synchronous machine device 90 may include an optional three-phase coupling transformer 92 having a primary winding 94 and a secondary winding 96 for each phase. If used, the primary winding 92 is in series with and couples together conductors 148a and 148b for each phase. A synchronous machine 98, such as a synchronous condenser, is connected in series with the secondary winding 96 of coupling transformer 92 (if used). Alternatively, the synchronous machine 98 may be directly coupled with the excited winding 134 of the series transformer 130.

The synchronous machine 98 may be controlled in a conventional manner to provide the same modulation ($V_M$) as described above with respect to the VSI 88. The use of the VSI device 80 or the synchronous machine device 90 in the circuit of FIG. 3A is dependent upon the economics of the situation. In some applications, the voltage source inverter device 80 may be the better selection, while in other applications, the synchronous machine device 90 of FIG. 3B may be a better selection.

FIG. 4 is a graph illustrating the power angle curve for the overall transmission system including the variable source phase shifter 120 having the voltage source inverter device 80 of FIG. 3A, or the synchronous machine device 90 of FIG. 3B. The solid line labelled "NORM." represents the normal power angle for a conventional phase-shifting transformer system, such as that shown in FIG. 8A or FIG. 9A, or for the variable source phase shifter 120 of FIG. 3A when zero voltage modulation $V_M$ is applied by the variable source device 80 or 90. The dashed curves represent additive and subtractive voltage modulations, $+V_M$ and $-V_M$, respectively, which may be provided by either variable source device 80 or 90.

The small signal modulating embodiments of FIGS. 1, 3A and 3B may be used in combination with various embodiments of a thyristor-augmented switching network (see FIGS. 5-7) described further below which achieve larger changes in the phase shifter setting, that is, the range through which the phase shift angle may be varied. Several alternate embodiments of a thyristor-augmented modified switching network will now be discussed.

FIG. 5 illustrates one embodiment of a three-phase, thyristor-augmented, fast-acting phase shift control switching network 250. Several of the items numbered in FIG. 5 are the same as described with respect to the FIG. 1 embodiment and have item numbers increased by 200 over the item numbers for the like components in FIG. 1. For example, the excited windings 234 are coupled to the switching network 250 by the three-phase conductors 246-248, as opposed to the single phase representation of FIG. 1, where these conductors are represented by conductors labelled 46 and 48. Also, for convenience and clarity, the regulating windings 244 and LTC 252 for each phase are shown schematically within the switching network 250 in FIG. 5. Furthermore, for simplicity, while each of the phases designated A, B and C are shown, the illustrated embodiment will be discussed with reference to only the phase A leg, labelled 202, since it is apparent from FIG. 5 that each of the phases are constructed and operate identically. Indeed, the load tap changer (LTC) is a three-phase device which changes taps simultaneously on each phase A, B and C.

The phase A leg 202 has a three-phase mechanical thyristor-augmented reversing switch assembly 203 which has a reversing switch 204, also designated as M1. The reversing switch assembly 203 selectively couples either end of the regulating winding 244 with the excited windings 234. The reversing switch 204 cooperates with the LTC 52, 152, 252, etc. to establish a nominal phase-shifting voltage level on the series transformer series winding 32, 132. The reversing switch 204 may be a conventional three phase reversing switch, as described in the background portion above with respect to FIG. 10, which simultaneously switches between the opposing ends of winding 244 for each phase A, B and C.

In the illustrated switching network 250, the reversing switch assembly 203 includes thyristor augmentation of the reversing switch 204 provided by a pair of conventional bi-directional thyristor valves 206 and 208, also designated T1 and T2, respectively. The thyristor valves described herein may be constructed of a plurality of discrete thyristors, which may be conventional thyristors, gate-turn-off thyristors (GTOs), MOS-controlled thyristors (metal-oxide-silicon), and the like or combinations thereof known to be interchangeable by those skilled in the art. As discussed in the background portion above, the reversing switch assembly 203 causes a net change of phase shift which is equal to the rated maximum phase shift of the phase shifter 20, 120.

In operation, the reversing switch assembly 203 is preferably operated in the following manner. During steady-state conditions, the M1 reversing switch 204 conducts the current, and the T1 and T2 valves 206, 208 are open, that is, in a non-conducting state. For switching operations, the M1 reversing switch 204 is opened and the current previously passing therethrough is commutated to either the T1 valve or the T2 valve. Either the T1 valve or the T2 valve will continue to conduct according to the needs of the overall power system until a new steady-state condition is reached. Upon reaching the new steady-state condition, the M1 reversing switch 204 may be reclosed while the T1 and T2 valves 206, 208 revert to an open non-conducting state. Allowing the mechanical M1 reversing switch to conduct during steady-state conditions, rather than the thyristor valves, advantageously reduces steady-state losses.

Furthermore, by employing a pair of thyristor valves 206 and 208 for each phase, the reversing switch assembly 203 may be operated many times during a system swing when the transmission line 22, 122 is experiencing rapid power fluctuations. The pair of valves 206 and 208 advantageously provide for very little delay during such rapid multiple operation of the M1 reversing switch 204 to provide discrete changes in the setting of the phase shifter 20, 120 during such system swings. The switching may occur at a frequency of twice the frequency of the transmission line 22, that is, during every half cycle at a zero-crossing of the current waveform. The magnitude of the discreet step provided by switching network 250 is on the order of the maximum phase shift of the phase shifter 20, 120.

Thus, it is advantageous to provide a new phase shifter with the T1 and T2 pair of thyristor valves 206 and 208. It is also advantageous retrofit and upgrade a preexisting phase shifter for faster performance by adding the T1 and T2 pair of valves 206 and 208 to each phase. Alternatively, a preexisting mechanical reversing switch could be replaced by the entire reversing switch assembly 203 if desired for a particular application. Furthermore, the switching network 250 may be employed in a variable susceptance phase shifter 20, a variable source phase shifter 120, or a conventional phase shifter, such as that shown in FIG. 8A or FIG. 9A.

Figure 6:
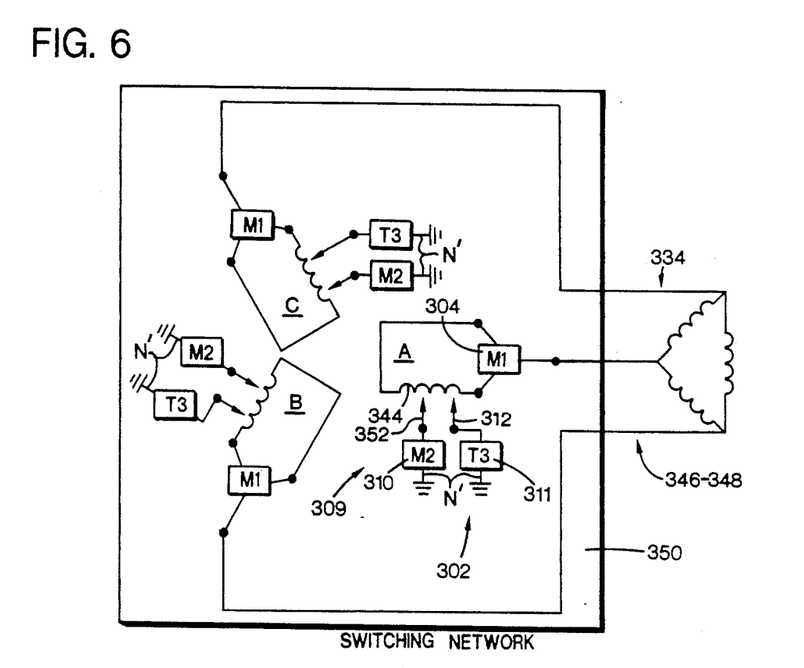
FIG. 6 is a three-phase schematic block diagram of an alternate form of a phase-shifting transformer system of the present invention using a thyristor-switched no load tap changer scheme.

FIG. 6 illustrates another embodiment of a three-phase fast-acting, thyristor-augmented, phase shift control switching network 350. Several of the items numbered in FIG. 6 are the same as described with respect to the FIG. 1 embodiment and have item numbers increased by 300 over the item numbers for the like components in FIG. 1. For example, the excited windings 334 are coupled to the switching network 350 by the three-phase conductors 346-348, as opposed to the single phase representation of FIG. 1, where these conductors are represented by conductors labelled 46 and 48. Also, for convenience and clarity, the regulating windings 344 and LTC 352 for each phase are shown schematically within the switching network 350 in FIG. 6. Furthermore, for simplicity, while each of the phases designated A, B and C are shown, the illustrated embodiment will be discussed with reference to only the phase A leg, labelled 302, since it is apparent from FIG. 6 that each of the phases are constructed and operate identically. The phase A leg 302 of switching network 350 may optionally include a thyristor-augmented reversing switch (not shown) as described above with reference to FIG. 5.

In FIG. 6, the load tap changer (LTC) of the previously described embodiments has been substituted with a switched load tap changer (LTC) 309. The switched LTC 309 comprises a mechanical switch 310 (also designated as M2) coupling the LTC wiper 352 with the neutral N' of the regulating winding 244.

Additionally, the FIG. 6 switching network 350 includes thyristor augmentation of the load tap changer comprising a thyristor valve 311 (also designated T3) coupling a first one of the plural taps of the regulating winding 344 with the neutral ground potential N'. This alternate connection of the thyristor valve 311 advantageously provides for varying the magnitude of discrete step which may be obtained during the phase shifter operation.

As an alternate embodiment, if the step size needed for system stabilization varies with the operating conditions of the transmission line 22, the switching network 350 may include a no-load tap changer 312. The no-load tap changer 312 selectively couples the T3 thyristor valve 311 with one of the plural taps of the regulating winding 344 for varying the step size as required to meet the stabilization needs of the power system. This variable step size capability may be realized by allowing the no-load tap changer 312 to be moved between the plural taps of the regulating winding 344 when the T3 thyristor valve 311 is in a non-conducting state and the switched LTC 309 is conducting. Once the wiper of the no-load tap changer 312 is in a fixed position at one of the regulating winding taps, the T3 thyristor valve may begin conducting and the switched LTC 309 may cease to conduct (i.e. a non-conducting state) by opening the M2 switch 310. In this manner, the magnitude of a discrete step change in the nominal phase-shifting voltage level $V_S$ on the series winding 32, 132 may be changed by positioning the no-load tap changer 312 with respect to the switched LTC 309 during operation.

It is apparent that a new phase-shifting transformer system may be manufactured with a switching network having a thyristor-augmented LTC, as shown in FIG. 6. For example, the switching network 350 may be used in the variable susceptance phase shifter 20 of FIG. 1 or the variable source phase shifter 120 of FIG. 3, or a phase shifter which does not include any of the modulators 60, 80 or 90 of FIGS. 1, 3A and 3B, respectively. Furthermore, it is also apparent that a preexisting control system or switching network of a preexisting phase-shifting transformer set, such as that shown in FIGS. 8A or 9A may be retrofitted in the manner shown in FIG. 6. For example, an optional T1 and T2 pair of thyristors (not shown) may be added as shown in FIG. 5 to augment a reversing switch. The preexisting load tap changer (LTC) may be substituted with a switched load tap changer (LTC) 309. A T3 thyristor 311 may be coupled directly with a predetermined one of the regulating winding taps, and if coupled by a no-load tap changer 312, with a selected one of the plural taps of the regulating winding 344. If the no-load tap changer 312 is included, the step size may be varied as required by the operating conditions of the transmission line 22.

Figure 7:
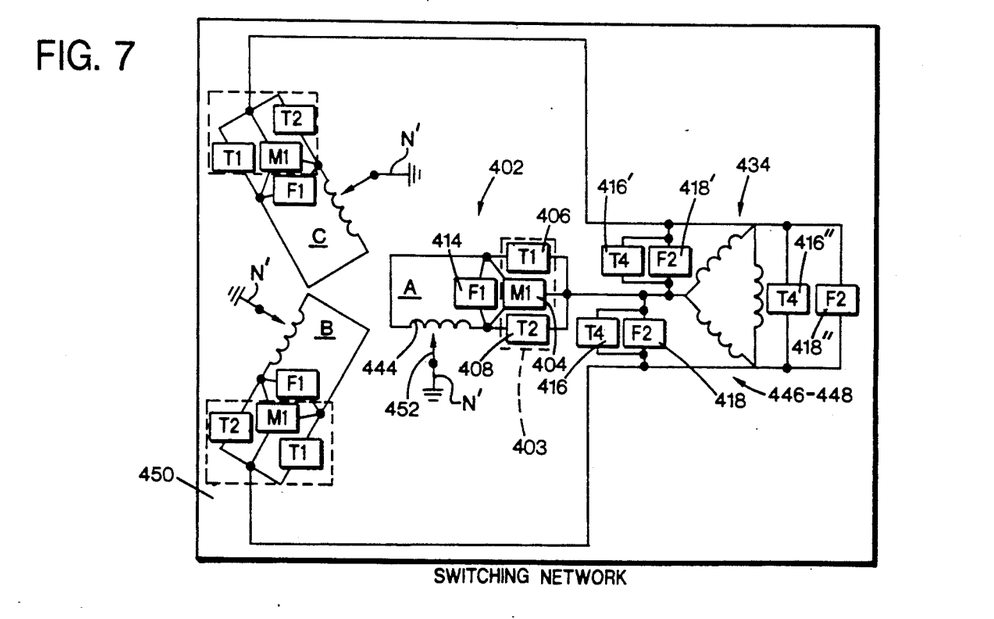
FIG. 7 is a three-phase schematic block diagram of another alternate phase-shifting transformer system of the present invention with provisions for continuous control.

FIG. 7 illustrates another embodiment of a three-phase fast-acting, thyristor-augmented, phase shift control switching network 450. Several of the items numbered in FIG. 7 are the same as described with respect to the FIG. 1 embodiment and have item numbers increased by 400 over the item numbers for the like components in FIG. 1. For example, the excited windings 434 are coupled to the switching network 450 by the three-phase conductors 446-448, as opposed to the single phase representation of FIG. 1, where these conductors are represented by conductors labelled 46 and 48. Also, for convenience and clarity, the LTC 452, the regulating windings 444 and excited windings 434 for each phase are each schematically shown within the switching network 450, although it is apparent excited windings 434 and regulating windings 444 are typically housed within separate tanks. Furthermore, for simplicity, while each of the phases designated A, B and C are shown, the illustrated embodiment will be discussed with reference to only the phase A leg 402, since it is apparent from FIG. 7 that each of the phases are constructed and operate identically.

The illustrated switching network 450 of FIG. 7 has a mechanical reversing switch 404 (also M1) augmented by an optional pair of thyristor valves 406 and 408 (also T1 and T2) which may be as described above with respect to the embodiment of FIG. 5. The switching network 450 also has three parallel output bidirectional thyristor valves, designated T4, with one T4 valve connected across each pair of phase conductors of the regulating windings 444 and in parallel with the delta-connected excited windings 434 for each phase. For example, the three T4 thyristor valves 416, 416' and 416" couple together pairs of the three phase conductors 446-448 with valve 416 being connected across phase A and phase B, valve 416' being connected across the phase A and C, and valve 416" being connected across phase B and C.

The switching network 450 operates to provide partial conduction control which chops the waveforms applied to the excited windings 434. In partial conduction control, rather than allowing the thyristors of the T1 and T2 valves 406 and 408 to conduct for complete half cycles, the current is forced to follow a different conduction path within the T4 valves by firing thyristors within the T4 valves. This partial conduction control is exercised over all three of the parallel thyristor valves 416, 416' and 416" to obtain continuous control over the effective phase shift between the limits established by the position of the LTC 452.

However, the switching network 450 embodiment also requires harmonic filters to mitigate any adverse affects of the chopped waveforms on the series and regulating transformers and on the AC power system which result from the partial conduction control. In the illustrated embodiment, a regulating winding filter 414, also designated F1, is connected across both ends of the regulating winding 444. Three parallel output filters F2 may be connected in parallel with each of the T4 thyristor valves. For example, an F2 filter 418 is connected in parallel with the T4 thyristor valve 416, an F2 filter 418' is coupled in parallel with the T4 valve 416', and F2 filter 418" is in parallel with the T4 valve 416". However, the undesirable harmonics are likely to exist for only a short time, that is on the order of several seconds, because the LTC 452 is usually moved to a new position to minimize the required chopping during steady state conditions.

In any of the switching network embodiments, 250, 350 or 450 of FIGS. 5, 6 and 7, respectively, the conducting one of the pair of thyristor valves (206 or 208, 406 or 408) augmenting the M1 reversing switch may be bypassed by the M1 reversing switch (204, 304, 404) during normal operation to advantageously reduce losses. Similarly, the T3 thyristor valve 311 of FIG. 6 which augment switched LTC 309 may be bypassed by closing the M2 switch 310 during normal operation to also reduce losses. This would be feasible if the M1 reversing switch (204, 304, 404) and the M2 switch 310 of the switched LTC 309 had opening times which were short enough to satisfy the stability needs of the power system.

Retrofitting Method Embodiments

In addition to the various embodiments discussed above for a new phase-shifting transformer system, the present invention also encompasses a method of retrofitting a preexisting phase-shifting transformer system to enhance its operating characteristics, such as to rapidly apply a desired phase shift to the voltage on the transmission line. Such a preexisting transformer system may be as described in the background portion above with respect to FIG. 8A or 9A. Referring to FIGS. 1, 3A and 3B, one illustrated retrofitting method of the present invention comprises the step of coupling a modulator with the series transformer to modulate the injected voltage $V_S$ of the series transformer series winding about a nominal voltage level established by the positions of the load tap changer and reversing switch.

With reference to FIG. 1, this method has several embodiments. In one embodiment, the retrofitting method step of coupling the modulator comprises coupling a variable susceptance device 60 in parallel with the series transformer series winding 32. In an alternate embodiment, the modulator may be coupled in parallel with the series transformer series winding 32 using a coupling transformer. In another embodiment, the variable susceptance device 60 may be a switched capacitor. In an additional embodiment of the retrofitting method, the variable susceptance device 60 may be a switched inductor.

With reference now to FIGS. 3A and 3B, the retrofitting method coupling step may include coupling a modulator comprising a variable source device in series with the series transformer excited winding 134. Optionally, this coupling step may include coupling the variable source device in series with the excited winding 134 using a coupling transformer, such as transformer 82 or 92. In another embodiment, the retrofitting method may include coupling a variable source device comprising a voltage source inverter 88. In a further embodiment, the retrofitting method may include coupling a variable source device comprising a synchronous device 98, such as a synchronous condenser.

According to another aspect of the present invention, a method of retrofitting a preexisting phase-shifting transformer system, such as described in the background portion above the respect to FIG. 8A or FIG. 9A, includes the step of augmenting the switching network with at least one thyristor valve. Alternatively, of course, the entire preexisting switching network may be replaced with an entirely new thyristor-augmented switching network, such as the networks 250, 350 or 450. Several illustrated embodiments of this retrofitting method are shown in FIGS. 5-7.

Referring first to the FIG. 5 embodiment, the retrofitting method augmenting step comprises augmenting the M1 reversing switch 204 with T1 and T2 thyristor valves 206 and 208. The T1 thyristor valve 206 is coupled between one end of the regulating winding 244 and the series transformer excited winding 234. The T2 is thyristor valve 208 is coupled between the other end of the regulating winding 244 and the series transformer excited winding 234.

The method illustrated with respect to FIG. 6 may optionally include augmenting of the M1 reversing switch 304 with the T1 and T2 thyristor valves (not shown), as described above with respect to FIG. 5. The embodiment of FIG. 6 also illustrates a retrofitting method wherein the step of augmenting comprises augmenting the load tap changer 352 with a T3 thyristor valve 312. The T3 thyristor valve 312 couples one of the plural taps of the regulating winding 344 with the neutral ground potential, which may be the neutral tie N' of the wye-connected three-phase illustrated embodiment. This method also includes the step of substituting the load tap changer, such as 252 illustrated in FIG. 5, with the switched load tap changer (LTC) 309.

In a further embodiment of this retrofitting method, a no-load tap changer 312, which is movable between the plural taps of the regulating winding 344, may be used to couple the T3 thyristor 311 therewith. In this manner, the no-load tap changer 312 may be moved between the plural taps of the regulating winding 344 when the T3 thyristor valve 311 is in a nonconducting state and the switched LTC 309 is conducting. The coupling step is also accomplished such that the T3 thyristor valve 311 is in a conducting state when the no-load tap changer 312 is in fixed position, coupling one of the regulating winding plural taps with the T3 thyristor valve 311, and when the M2 switch 310 of the switched LTC 309 is in a nonconducting state. This coupling step is accomplished so as to vary the magnitude of a discrete step by which the nominal phase-shifting voltage level on the series transformer series winding 32, 132 is changed by positioning the no-load tap changer 312 with respect to the load tap changer 352 during operation.

FIG. 7 illustrates several other alternate embodiments of the retrofitting method of the present invention. In a first embodiment, the retrofitting method augmenting step comprises coupling a T4 thyristor valve, such as valve 416, and an F2 filter, such as filter 418, in parallel with the series transformer series winding 434. If a further embodiment of the retrofitting method, the augmenting step also includes augmenting the M1 reversing switch 404 with T1 and T2 thyristor valves 404 and 406, for example, in the manner as described above with respect to FIG. 5. In this embodiment, the retrofitting method also includes the step of coupling an F1 filter, such as filter 414, between the two opposing ends of the regulating winding 444.

According to yet another aspect of the present invention, the retrofitting method may also include the step of coupling a modulator, such as modulator 60 of FIG. 1, modulator 80 of FIG. 3A, or modulator 90 of FIG. 3B, with the series transformer 30, 130 so as to modulate the voltage of the series transformer series winding 32, 132 about a nominal phase-shifting voltage level, in addition to the step of augmenting the switching network with at least one thyristor valve.

FIGS. 1, 3A, 3B and 5-7 illustrate another aspect of the present invention where a method is provided of applying a desired phase shift to the voltage $V_1$ on the polyphase transmission line 22 which operates at a system frequency. This method includes the steps of drawing the polyphase regulating current, such as $I_R$, at the regulating voltage, such as $V_R$, from the transmission line 22, and establishing a nominal magnitude of a shifting voltage $V_S$ or $V_M$ which is in quadrature with the regulating voltage. In a changing step, the shifting voltage magnitude is changed within a single cycle of the system frequency to modify the phase shift as desired. In an injecting step, the changed shifting voltage is injected in series with the voltage on the transmission line 22.

In the illustrated embodiment of FIGS. 1, 3A and 3B, the changing step comprises the step of modulating the shifting voltage magnitude about the established nominal magnitude with a variable modulating voltage $V_M$. In the FIG. 5 embodiment, the changing step comprises the step of changing the shifting voltage established nominal magnitude at a zero crossing of a half cycle of the system frequency by operating the T1 and T2 thyristor valves 206 and 208. In the FIG. 6 embodiment, the magnitude of the discrete steps by which the established nominal magnitude may be changed may be varied on line. This step magnitude is varied using the switched LTC 309 and the T3 thyristor valve 311 as described above.

As an alternate embodiment, if the step size needed for system stabilization varies with the operating conditions of the transmission line 22, the switching network 350 may include a no-load tap changer 312.

In the embodiment of FIG. 7, the changing step comprises the step of chopping the shifting voltage waveform between zero crossings of a half cycle of the system frequency by firing the thyristors within the T4 valves to vary the shifting voltage magnitude about the established nominal magnitude within a half cycle of the system frequency. The chopped shifting voltage is then injected in series with the voltage on the transmission line using the series transformer, such as 30 or 130. Additionally, where undesirable harmonics are generated during the chopping step, the illustrated method may also include the step of filtering the undesirable harmonics from the chopped shifting voltage prior to the injecting step using the F2 filters 418, 418′ and 418″. If the reversing switch assembly 403 is used, the filtering step also comprises filtering across the two opposing ends of the regulating winding 444 using the F1 filters, such as filter 414.

Having illustrated and described the principles of our invention with respect to a preferred embodiment, it should be apparent to those skilled in the art that our invention may be modified in arrangement and detail without departing from such principles. For example, other types of power switching devices other than thyristor valves described herein may be employed in the illustrated thyristor-augmented switching networks. We claim all such modifications falling within the scope and spirit of the following claims.

We claim:

1. A phase-shifting transformer system for applying a desired phase shift to the voltage on a transmission line, comprising:
    a series transformer with mutually magnetically coupled series and excited windings, the series winding for coupling in series with the transmission line;
    a regulating transformer with mutually magnetically coupled exciting and regulating windings, the exciting winding for receiving power from the transmission line;
    a switching network coupling together the regulating winding of the regulating transformer with the excited winding of the series transformer, for establishing a nominal phase-shifting voltage level on the series transformer series winding; and
    a modulator for modulating the voltage of the series transformer series winding about the nominal phase-shifting voltage level provided by the switching network.

2. A phase-shifting transformer system according to claim 1 wherein the modulator comprises a variable susceptance device coupled in parallel with the series transformer series winding.

3. A phase-shifting transformer system according to claim 2 wherein the variable susceptance device comprises a switched capacitor.

4. A phase-shifting transformer system according to claim 2 wherein the variable susceptance device comprises a switched inductor.

5. A phase-shifting transformer system according to claim 1 wherein the modulator comprises a variable source device coupled in series with the series transformer excited winding.

6. A phase-shifting transformer system according to claim 5 wherein the variable source device comprises an inverter.

7. A phase-shifting transformer system according to claim 5 wherein the variable source device comprises a synchronous machine.

8. A phase-shifting transformer system according to claim 1 further including a coupling transformer which couples the modulator with the series transformer.

9. A phase-shifting transformer system according to claim 1 wherein the series winding has a center tap, and the regulating transformer exciting winding is coupled with the transmission line through the center tap of the series transformer series winding.

10. A phase-shifting transformer system for applying a desired phase shift to the voltage on a transmission line of a power system, comprising:
    a series transformer with mutually magnetically coupled series and excited windings, the series winding for coupling in series with the transmission line;

a regulating transformer with mutually magnetically coupled exciting and regulating windings, the exciting winding for receiving power from the transmission line, and the regulating winding having two opposing ends with plural taps therebetween; and a thyristor-augmented switching network coupling together the regulating winding of the regulating transformer with the excited winding of the series transformer, with the switching network having a load tap changer for selectively coupling one of the plural taps of the regulating winding with a neutral ground potential, and an openable reversing switch for selectively coupling either end of the regulating winding with the series transformer excited winding, with at least one of the load tap changer and the reversing switch being augmented by at least one thyristor valve for conducting full load current therethrough as required by the power system during application of the desired phase shift and at least until a new steady-state condition is reached, positions of the load tap changer and reversing switch establishing a nominal phase-shifting voltage level on the series transformer series winding.

11. A phase-shifting transformer system according to claim 10 wherein the thyristor-augmented switching network further includes thyristor augmentation of the reversing switch comprising first and second thyristor valves, with the first thyristor valve coupling one end of the regulating winding with the series transformer excited winding, and the second thyristor valve coupling the other end of the regulating winding with the series transformer excited winding, one of the first and second thyristor valves conducting the full load current while the reversing switch is open.

12. A phase-shifting transformer system according to claim 10 wherein the thyristor-augmented switching network further includes thyristor augmentation of the load tap changer comprising a thyristor valve coupling a first one of the plural taps of the regulating winding with the neutral ground potential, and wherein the load tap changer comprises a switched load tap changer.

13. A phase-shifting transformer system according to claim 12 wherein the thyristor-augmented switching network further includes a no-load tap changer selectively coupling the thyristor valve with one of the plural taps of the regulating winding, the no-load tap changer being movable from between the plural taps of the regulating winding when the thyristor valve is in a non-conducting state and the switched load tap changer is conducting, the thyristor valve being in a conducting state when the switched load tap changer is in a non-conducting state, so as to vary the magnitude of a discrete step by which the nominal phase-shifting voltage level on the series transformer series winding is changed by positioning the no-load tap changer with respect to the load tap changer during operation.

14. A phase-shifting transformer system according to claim 10 wherein the thyristor-augmented switching network further includes a first thyristor valve and a first filter, each coupled in parallel with the series transformer series winding.

15. A phase-shifting transformer system according to claim 14 wherein the thyristor-augmented switching network further includes:

thyristor augmentation of the reversing switch comprising first and second thyristor valves, with the first thyristor valve coupling one end of the regulating winding with the series transformer excited winding, and the second thyristor valve the coupling the other end of the regulating winding with the series transformer excited winding; and a second filter located between the two opposing ends of the regulating winding.

16. A phase-shifting transformer system according to claim 10 further including a modulator coupled with the series transformer to modulate the voltage of the series transformer series winding about the nominal phase-shifting voltage level.

17. A method of retrofitting a phase-shifting transformer system to rapidly apply a desired phase shift to the voltage on a transmission line, comprising the steps of:

identifying a phase-shifting transformer system requiring retrofitting which includes:

a series transformer having mutually magnetically coupled series and excited windings, the series winding being coupled in series with the transmission line;

a regulating transformer having mutually magnetically coupled exciting and regulating windings, the exciting winding for receiving power from the transmission line; and a switching network coupling together the regulating winding of the regulating transformer with the excited winding of the series transformer for establishing a nominal phase-shifting voltage level on the series transformer series winding; and coupling a modulator with the series transformer to modulate the voltage of the series transformer series winding about the nominal phase-shifting voltage level provided by the switching network.

18. A method of retrofitting according to claim 17 wherein the step of coupling the modulator comprises coupling a variable susceptance device in parallel with the series transformer series winding.

19. A method of retrofitting according to claim 18 wherein the variable susceptance device comprises a switched capacitor.

20. A method of retrofitting according to claim 18 wherein the variable susceptance device comprises a switched inductor.

21. A method of retrofitting according to claim 17 wherein the step of coupling the modulator comprises coupling a variable source device coupled in series with the series transformer excited winding.

22. A method of retrofitting according to claim 21 wherein the variable source device comprises an inverter.

23. A method of retrofitting according to claim 21 wherein the variable source device comprises a synchronous machine.

24. A method of retrofitting according to claim 17 wherein the step of coupling the modulator comprises coupling the modulator with the series transformer using a coupling transformer.

25. A method of retrofitting a phase-shifting transformer system to rapidly apply a desired phase shift to the voltage on a transmission line, comprising the steps of:

identifying a phase-shifting transformer sytem requiring retrofitting which includes:

a series transformer having mutually magnetically coupled series and excited windings, with the series winding coupled in series with the transmission line;
a regulating transformer having mutually magnetically coupled exciting and regulating windings, with the exciting winding receiving power from the transmission line; and
a switching network coupling together the regulating transformer regulating winding with the series transformer excited winding for establishing a nominal phase-shifting voltage level on the series transformer series winding; and
augmenting the switching network with at least one thyristor valve for conducting full load current therethrough at least during the application of the desired phase shift to the voltage on the transmission line.

26. A method of retrofitting according to claim 25 wherein:
the identifying step comprises identifying a preexisting phase-shifting transformer system requiring retrofitting which includes the regulating winding having two opposing ends, and a switching network having an openable reversing switch selectively coupling either end of the regulating winding with the series transformer excited winding; and
the step of augmenting comprises augmenting the reversing switch with first and second thyristor valves by coupling the first thyristor valve between one end of the regulating winding and the series transformer excited winding, and by coupling the second thyristor valve between the other end of the regulating winding and the series transformer excited winding so one of the first and second thyristor valves conducts the full load current when the reversing switch is open.

27. A method of retrofitting according to claim 25 wherein:
the identifying step comprises identifying a preexisting phase-shifting transformer system requiring retrofitting which includes a regulating winding having plural taps, and a switching network having a load tap changer selectively coupling one of the plural taps of the regulating winding with a neutral ground potential;
the step of augmenting comprises augmenting the load tap changer with a thyristor valve coupling a first one of the plural taps of the regulating winding with the neutral ground potential, and the method further includes the step of substituting the load tap changer with a switched load tap changer.

28. A method of retrofitting according to claim 27 wherein the step of augmenting comprises coupling a no-load tap changer between the thyristor valve and the regulating winding to selectively couple the thyristor valve with one of the plural taps of the regulating winding, the no-load tap changer being movable from between the plural taps of the regulating winding when the thyristor valve is in a non-conducting state and the switched load tap changer is conducting, the thyristor valve being in a conducting state when the no-load tap changer is in a fixed position coupling one of the regulating winding plural taps with the thyristor valve and when the switched load changer is in a non-conducting state, so as to vary the magnitude of a discrete step by which the nominal phase-shifting voltage level on the series transformer series winding is changed by positioning the no-load tap changer with respect to the load tap changer during operation.

29. A method of retrofitting according to claim 25 wherein the step of augmenting comprises coupling a first thyristor valve and a first filter in parallel with the series transformer series winding.

30. A method of retrofitting according to claim 29 wherein:
the identifying step comprises identifying a preexisting phase-shifting transformer system requiring retrofitting which includes the regulating winding having two opposing ends, and a switching network having a reversing switch selectively coupling either end of the regulating winding with the series transformer excited winding;
the step of augmenting comprises augmenting the reversing switch with second and third thyristor valves by coupling the second thyristor valve between one end of the regulating winding and the series transformer excited winding, and by coupling the third thyristor valve between the other end of the regulating winding and the series transformer excited winding; and
the retrofitting method further comprises the step of coupling a second filter between the two opposing ends of the regulating winding.

31. A method of retrofitting according to claim 25 further including the step of coupling a modulator with the series transformer for modulating the voltage of the series transformer series winding about the nominal phase-shifting voltage level established by the switching network.

32. A method of applying a desired phase shift to the voltage on a polyphase transmission line operating at a system frequency, comprising the steps of:
drawing a polyphase regulating current at a regulating voltage from the transmission line;
establishing a nominal magnitude of a shifting voltage between maximum and minmum values, the shifting voltage being in quadrature with the regulating voltage;
changing the shifting voltage magnitude to any value between the maximum and minimum values within a single cycle of the system frequency to modify the phase shift as desired; and
injecting the changed shifting voltage in series with the voltage on the transmission line.

33. A method of applying a desired phase shift according to claim 32, wherein the changing step comprises the step of modulating the shifting voltage magnitude about the established nominal magnitude with a variable modulating voltage.

34. A method of applying a desired phase shift according to claim 32, wherein the changing step comprises the step of changing the shifting voltage established nominal magnitude at a zero crossing of a half cycle of the system frequency.

35. A method of applying a desired phase shift according to claim 32, wherein:
the changing step comprises the step of chopping the shifting voltage waveform between zero crossings of a half cycle of the system frequency to vary the shifting voltage magnitude about the established nominal magnitude within a half cycle of the system frequency; and
the injecting step comprises the step of injecting the chopped shifting voltage in series with the voltage on the transmission line.

36. A method of applying a desired phase shift according to claim 35, wherein:
undesirable harmonics are generated during the chopping step; and
the method further includes the step of filtering the undesirable harmonics from the chopped shifting voltage prior to the injecting step.

* * * * *